March 29, 1949. D. F. McGILL 2,465,739
POWER TRANSMISSION DEVICE
Filed Oct. 26, 1943 4 Sheets-Sheet 3

INVENTOR
DANIEL F. McGILL
BY Harold Cook
ATTORNEY

March 29, 1949. D. F. McGILL 2,465,739
POWER TRANSMISSION DEVICE
Filed Oct. 26, 1943 4 Sheets-Sheet 4

FIG. 10.

INVENTOR
DANIEL F. McGILL
BY
ATTORNEY

Patented Mar. 29, 1949

2,465,739

UNITED STATES PATENT OFFICE 2,465,739

POWER TRANSMISSION DEVICE

Daniel F. McGill, Portland, Oreg., assignor to Donald W. Green, Portland, Oreg., as trustee Application October 26, 1943, Serial No. 507,753

21 Claims. (Cl. 74—677)

1

This invention relates to a power transmission device, wherein a kinetic drive is coupled with either a hydraulic pressure drive or mechanical gearing to produce a compound torque ratio.

The primary object of the invention is to provide a transmission mechanism comprising a kinetic drive coupled with a hydraulic pressure drive or mechanical gearing in such manner that the torque output equals the product of the torque produced by the kinetic drive multiplied by the product of the pressure drive or gear ratio.

A further object of the invention is to provide a power transmission device capable of producing an infinite number of speed and torque ratios automatically, solely in response to load conditions, without the intervention of an operator.

A further object of the invention is to provide in a power transmission device a combination of a kinetic drive and a hydraulic pressure drive or mechanical gearing capable of producing a multiplication of torque through a compound gearing in as high a torque ratio as may be desired, and also capable of transmitting power in a 1:1 ratio.

It is a further object of the invention to provide in a transmission mechanism comprising conjoined fluid drive and mechanical gear transmissions, means for completing a direct mechanical connection from the driving shaft to the planet carrier of the mechanical gear transmission for driving the output shaft in substantially a 1:1 ratio, while at the same time providing for absorbing shock within the fluid drive.

It is a further object of the invention to provide in a hydraulic transmission mechanism a device which will produce as much torque in reverse as in the forward direction.

It is a further object of the invention to produce a hydraulic transmission mechanism wherein the compression of the engine may be utilized to relieve the brakes.

It is a further object of the invention to provide a hydraulic transmission mechanism which, on steep grades, can be shifted to reverse position to utilize the power of the engine for braking the speed of the vehicle.

It is a further object of the invention to provide a hydraulic power transmission device employing compound gearing whereby the driving ratio in the differential may be so increased that the engine may be driven at a relatively slow speed in direct drive, and having the advantages of effecting considerable saving both in wear and tear on equipment, as well as in fuel and oil.

These and other desired objects and advantages of the invention are obtained through the novel arrangement, the unique construction and the improved combination of the various parts hereinafter described in conjunction with the accompanying drawings, it being understood that

2 various changes in form, proportion, size and details of construction within the scope of the claims may be resorted to without departing from the spirit or sacrificing any of the advantages of the invention.

Figure 1:
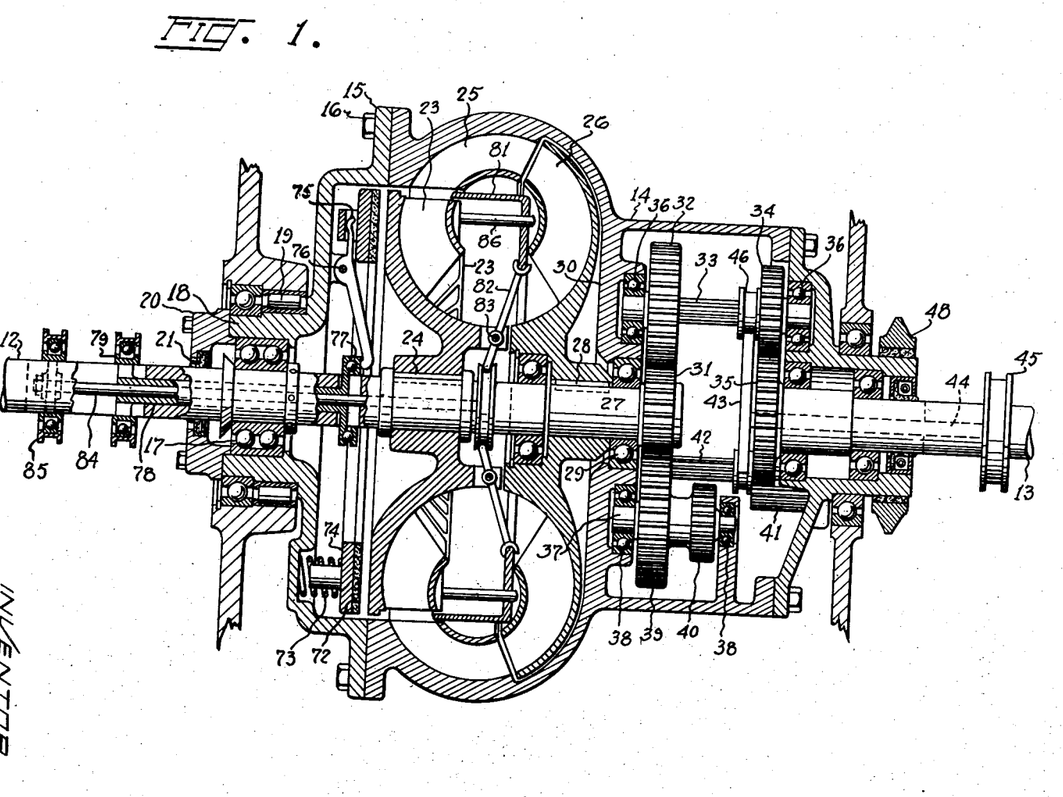
Figure 1 is a sectional elevation, taken longitudinally of a transmission mechanism, comprising the combination of a kinetic or turbine drive and a mechanical gear transmission.

The transmission unit illustrated in Figure 1 comprises an input shaft 12 and an output shaft 13 mounted in axial alignment. Rotatably journaled on the driving and driven shafts is a casing 14, enclosing the ends of the respective shafts, and having mounted therewithin elements of a kinetic or turbine drive for transmitting torque by means of fluid velocities and pressure, together with elements of a gear train for developing torque by means of the ratio differential between gears.

The casing 14 is provided with an end plate 15 secured thereto as by cap screws 16. The end plate 15 is provided with a cylindrical flange 18 forming a housing for bearings 17 which support the radial load of the casing. The outer surface of the flange 18 forms a part of a one-way brake or free wheeling unit 19 of conventional design for preventing reverse rotation of the casing under conditions hereinafter more specifically described. The flange 18 is provided with a cover plate 20 within which are mounted oil seal rings 21.

The turbine drive comprises an impeller 23 secured to the input shaft 12 by means of a key 24. Affixed to the casing and rotatable therewith are guide vanes 25 which function in a manner presently to be described. The turbine drive also comprises a torque converter comprising a turbine runner 26 affixed to a shaft 27 by means of a key 28. The shaft 27 is journaled in bearings 29 mounted in a transverse wall portion 30 of the casing 14. Mounted on the shaft 27 is the sun gear 31 of a differential transmission comprising sun gear 31, and gear 32 keyed to countershaft 33, and in constant mesh with the sun gear 31. Splined on countershaft 33 is a second gear 34 which meshes with driven gear 35 keyed to the output shaft 13 for driving the output shaft in the direction of rotation of the input shaft. The countershaft 33 is journaled in bearings 36, 36, mounted in transverse wall sections of the casing 14.

For reversing the direction of rotation of the output shaft 13 there is provided a second countershaft 37 journaled in bearings 38, 38 mounted in transverse wall sections of the casing 14. Keyed to the countershaft 37 is a gear 39 in constant mesh with sun gear 31. Also keyed to countershaft 37 is a reverse gear 40 adapted to be engaged by a sliding gear 41 splined on a shaft 42 and constantly in mesh with the driven gear 35. Engagement of the gears 40 and 41 operates to drive the driven gear 35 and output shaft 13 in a direction opposite to the direction of rotation of the input shaft 12. It will be understood that shaft 42 is journaled in bearings (not shown) mounted in the casing 14. The sliding gear 41 is controlled by means of a disc 43 secured to a shaft 44 extending longitudinally of the output shaft 13 and connected to a control element 45 for operation in a manner well understood by those skilled in the art. The disc 43 also engages in a grooved collar 46 affixed to the gear 34 so that the gear 34 is moved longitudinally of countershaft 33 to disengage the driven gear 35 at the same time that sliding gear 41 is moved longitudinally of shaft 42 to engage the reverse gear 40. A brake 48 is provided to hold the casing 14 stationary when the output shaft 13 is to be driven in the reverse direction.

A ring valve 81 is operable to control the output or neutralize the effect of the impeller 23. The ring valve is actuated by a lever arm 82 pivoted at 83 and connected by a shaft 84 to a collar 85 movable longitudinally of the input shaft 12. Movement of the collar 85 in one direction causes the ring valve 81 to close over the discharge ends of the impeller buckets, throttling the circulation of liquid and reducing the torque transmission capacity of the turbine drive. The impeller 23 then becomes a liquid fly wheel which acts as a balance for the engine, and prevents fluid drag on the turbine blades such as would cause creeping of the output shaft when the engine is idling. A plurality of pins 86 secured at one end to the inner shell of the impeller 23 engage through orifices in a flanged portion of the ring valve 81 to guide its movement between open and closed positions.

A clutch may be provided to couple the input shaft 12 to the casing 14 in direct drive to avoid the slip usually occurring in a fluid coupling. The clutch element 72 is urged into engagement with the impeller 23 by means of compression springs 73 which bear at one end against the inner surface of the end plate 15 and at the other end against the clutch plate 74. The clutch is disengaged by means of a lever arm 75 pivoted at 76 and actuated by a disc 77 secured to a shaft 78 extending longitudinally of the input shaft 12 and connected to a collar 79 mounted on the shaft 12 and adapted for longitudinal movement relative thereto.

Upon engagement of the clutch 72 the input shaft 12 is connected directly to the casing 14 and thereby completes a direct mechanical connection from the input shaft 12 to the planet carrier for the gears 32 and 34. When this condition prevails the turbine drive operates as a fluid coupling, with the guide vanes 25 connected to the impeller 23 and functioning as impeller vanes. Due to the ratio differential of the gearing between the shaft 27 and the output shaft 13, the reaction load on the casing is greater than the load on the turbine runner 26 by an amount equal to the difference between the pump and motor (Figure 2) or between the sun gear 31 and driven gear 35 (Figure 1), as the case may be. However, a sufficient proportion of the total load is transmitted to the turbine drive through shaft 27 so that road shocks are absorbed in the fluid coupling.

Figures 2, 3:
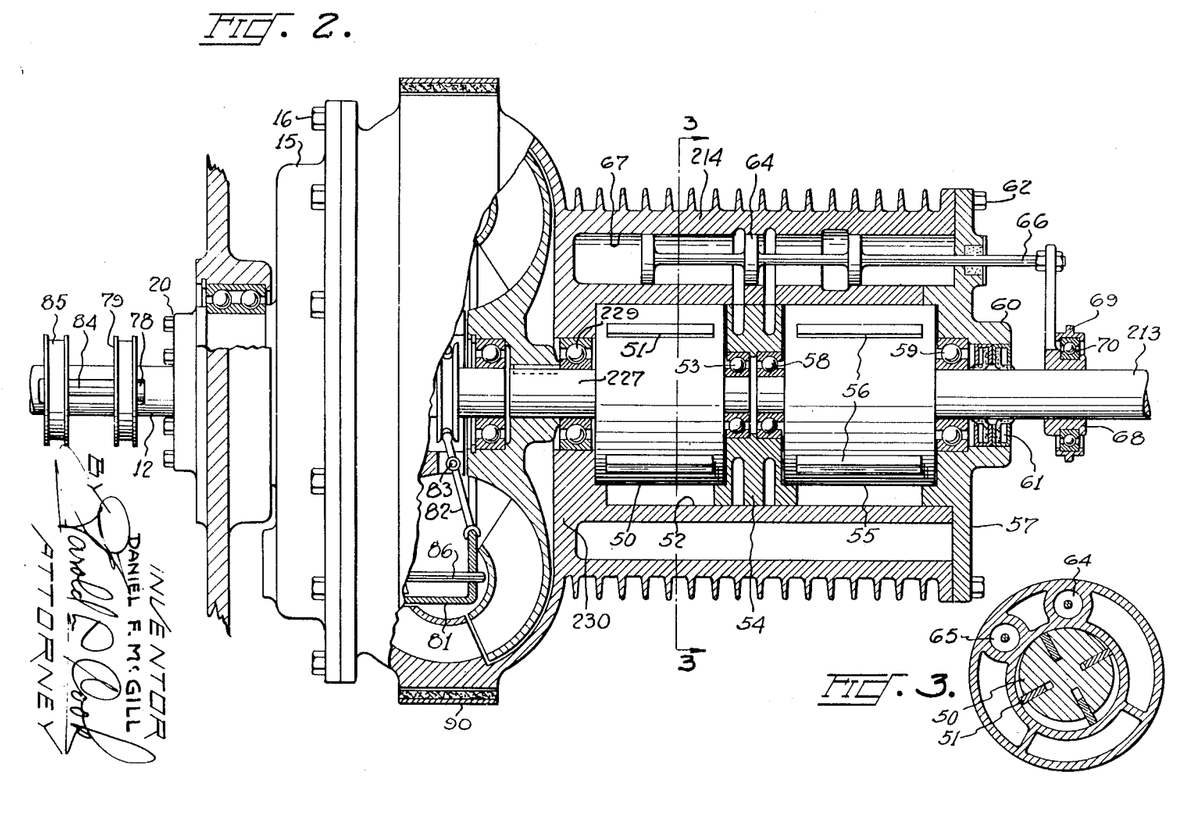
Figure 2 is a sectional elevation, taken longitudinally of a transmission mechanism, comprising the combination of a kinetic or turbine drive and a hydraulic pressure drive utilizing a pump and motor.
Figure 3 is a sectional elevation taken on the line 3—3 of Figure 2.

In Figure 2 is shown a transmission unit comprising a casing 214 having mounted therewithin elements of a delivery pump and motor for developing torque by means of fluid pressure. Mounted on the shaft 227 are the elements of a delivery pump constituting a part of the pressure drive, comprising a rotor 50 having rotor blades 51. The pump chamber is defined by a cylindrical portion 52 of the casing 214. The shaft 227 is journaled in bearings 229 mounted in a transverse wall portion 230 of the casing 214 and in bearings 53 carried in a bearing block 54 mounted in the cylindrical portion 52 of the casing between the pump and motor chambers. The transverse wall 230 and bearing block 54 form the end walls, respectively, for the pump chamber.

The motor rotor 55, having rotor blades 56, is mounted on the inner end of the output shaft 213 and operates in a motor chamber defined by the cylindrical portion 52, and end walls comprising at one end of the chamber the end surface of the bearing block 54 and at the opposite end of the chamber the inner surface of an end plate 57 forming a closure member for the adjacent end of the cylindrical casing 214. The pump and motor are of the type described in detail in my copending application, Serial No. 390,294, filed April 25, 1941, for Fluid transmission mechanism, which has matured into Patent No. 2,409,374.

The output shaft 213 is journaled in bearings 58 mounted in the bearing block 54 and in bearings 59 mounted in the end plate 57. A cylindrical extension 60 of the end plate 57 contains oil seal rings 61 exteriorly of the bearings 59. The end plate 57 is secured to the cylindrical casing 214 as by cap screws 62.

Valves 64 and 65 are provided for determining the direction of rotation of the driven shaft, these valves being actuated by valve stems, one of which is shown at 66. The position of these valves determines to which side of the blades 56 of the motor rotor is admitted fluid under pressure, and from which side of said blades 56 fluid is discharged to the fluid reservoir. Pump means (not shown) is provided to supply liquid from the fluid reservoir to the delivery pump, and to the turbine chambers, in an amount necessary to insure efficient operation of these elements.

Valves 64 and 65 are slidably mounted in sleeves such as indicated at 67. The valve stems 66 extend longitudinally of the casing and project endwise therefrom, and are attached by suitable linkage to a grooved collar 68 slidably mounted on the output shaft 213. Movement of the collar 68 longitudinally of the shaft is effected by means of a control mechanism including an arm 69 rotatably engaging the collar by means of bearings 70 disposed between flanges on the collar and on the control arm.

The operation of the mechanism hereinabove described is as follows: Assuming that the input shaft 12 is connected to a prime mover engine, rotation of this shaft drives the impeller 23 and imparts movement to the fluid within the fluid circuit of the turbine drive. The load on the driven shaft at the start reacts through the gearing and casing 14 against the one-way brake 19, by virtue of which both the casing 14 and guide member 25 are held stationary. While this condition prevails, fluid is delivered to the turbine runner 26 which rotates at a slow speed until the energy imparted to it by the circulating liquid increases this speed and the torque on the output shaft is reduced to normal.

In the device illustrated in Figure 2 the turbine runner rotates the shaft 227 in the direction of rotation of the input shaft 12. Fluid under pressure created by the pump is delivered to the motor to drive the output shaft 213 in the direction determined by the position of the valves 64 and 65. In the event the motor is driven in the direction of rotation of the input shaft 12, the reaction upon the casing 214 tends to hold the casing stationary against the one-way brake shown in detail in Figure 1. As long as this condition prevails the turbine blades 26 operate as a torque converter.

As the load on the driven shaft is lessened and the casing 14 and guide member 25 rotate in the direction of rotation of the input shaft 12, the guide member progressively ceases to function solely as an abutment means against which the fluid can react and is transformed in the well known manner into a fluid coupling. When the load on the driven shaft is such that the entire unit revolves at the same speed, the drive is direct with a 1:1 torque and speed ratio.

At such time as the casing 14 begins to rotate in a forward direction at a rate approaching the rate of rotation of the input shaft, the clutch element 72, mounted in the end plate 15, may be caused to engage the impeller 23 to cause the impeller and casing to rotate together. When the clutch 72 has been engaged in the manner hereinabove described, the impeller 23 and guide vanes 25 rotate together as an impeller, and the turbine blades 26 function as a fluid coupling to transmit the torque created by the engine to the shaft 27 and to the hydraulic pump or sun gear mounted thereon. Engagement of the clutch 72 drives the casing 14 against the reaction of the hydraulic motor or mechanical gearing, thereby eliminating the usual coupling slip.

In the event that the load on the driven shaft is increased to a point that the reaction on the casing becomes greater than the driving force of the liquid with the turbine runner operating as a fluid coupling, then the casing will rotate more slowly and the speed of the guide blades 25 becomes less than the speed of the turbine runner 26. As the rate of rotation of the casing is slowed and the rate of rotation of the guide blades becomes less than that of the turbine runner, the turbine runner 26 begins to function as a torque converter, with a corresponding increase in the torque produced, until such time as the reaction on the housing is sufficient to cause the housing to be held stationary against the one-way brake. When this condition prevails, the turbine runner 26 operates as a torque converter and produces its greatest amount of torque. With the torque converter delivering its maximum torque to shaft 27 the apparatus will produce a torque ratio on the driven shaft equal to the product of the torque produced by the torque converter multiplied by the product of the differential ratio in the hydraulic or mechanical gearing. For example, assuming a torque converter is capable of producing a maximum torque ratio of 5:1 and the differential ratio of the hydraulic or mechanical gearing is 2:1, the torque ratio between the driving and driven shafts under conditions last above described will be 10:1. Inasmuch as the reactive load is distributed between the casing and the torque converter, the load on the torque converter is much less than if the torque converter were directly connected to the driven shaft. This construction is inducive of higher efficiencies of the torque converter, as it will operate at higher speeds at various torque loads in the proportion that its reaction load is to the total reaction load on the driven shaft.

It will be understood that the hydraulic pressure drive or mechanical gearing may be so constructed as to change the torque output as desired. The higher the differential ratio which may be developed by the transmission gearing, the greater is the reaction on the casing, whereas the lower the differential ratio which may be developed by the transmission gearing, the less is the reaction on the casing. In a structure which will develop no higher than a 1:1 ratio between shaft 27 and output shaft 13, the only reaction on the casing is from the turbine runner, which reacts to slow the guide vanes 25 and cause the turbine runner to function as a torque converter. Under such conditions the torque delivered to the driven shaft will be no greater than the torque delivered by the torque converter.

The driven shaft may be operated in either direction while the casing 14 is held stationary. A maximum of torque may be had in either direction, but the speed of the driven shaft is limited in direct proportion as the speed ratio of the gearing is to the speed of the torque converter.

It will be seen that the device incorporates four relatively moving parts, each of which contributes to the transmission and/or multiplication of torque from the drive shaft to the driven shaft. Briefly described, these parts comprise (1) the impeller 23 which imparts motion to the liquid in the kinetic drive; (2) the turbine runner 26 and shaft 27 together with the elements of hydraulic or mechanical gearing affixed thereto; (3) the casing 14; and (4) the compound gearing or motor through which the sum total of all the torque produced by the first three named elements is imparted to the driven shaft. The common casing 14 acts as a reaction element through which the reaction from the driven shaft is transmitted to both transmissions.

The rotatable casing, or housing, 14 constitutes a common reaction member for both transmissions because it carries an individual reaction member in each transmission. In Figure 1, for example, the guide vanes 25 constitute the reaction member in the fluid drive transmission. The reaction member in the gear transmission is the planet carrier for the planet gears 32 and 34, comprising the wall portions of housing 14 carrying the bearings 36 for the planet gears, one of which wall portions is designated by the numeral 30. These reaction members are interposed between driving and driven elements in each transmission. In the fluid drive transmission the reaction member 25 is interposed between impeller 23 and runner 26, while in the gear transmission the planet carrier reaction member 30 is interposed between sun gear 31 and sun gear 35. The gear 31 is mounted on the shaft of runner 26 to provide connection between the driven element of the fluid transmission and the driving element of the gear transmission.

The mechanism herein shown and described as embodying the invention is in simple and practical form, it being intended that each part or element thereof may be representative of other parts, elements or mechanisms which may be used in substantially the same manner to accomplish the same or similar results. For example, the countershaft gearing may be varied to suit special requirements. Having illustrated the invention as employing a differential gear train of well known construction, it is intended to be within the scope of the invention to substitute therefor any other known construction which, when coupled with the primary drive in the manner illustrated, will function to produce a compound torque ratio.

In each of the modifications of the invention illustrated in Figures 1 and 2 of the drawings, the power input of the shaft 12 is transformed into flow energy except at such times as the clutch element 72 is in engagement with the impeller 23 to complete a mechanical connection between the input shaft 12 and the output shaft 13. At all other times the flow energy created by the impeller 23 is distributed through the casing 14 to the secondary gearing and through turbine runner 26 to the shaft 27. The primary drive may consist of one or more torque converters or couplings, or a converter and coupling may be employed together, as illustrated in Figures 4 to 9, inclusive.

Figure 4:
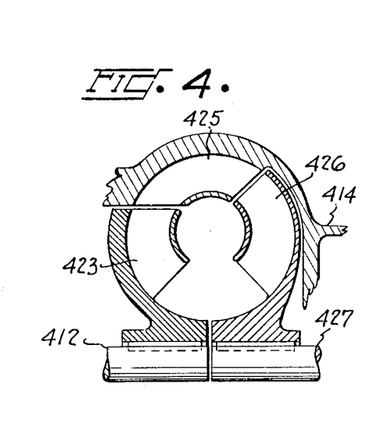
Figures 4 to 9 inclusive, are diagrammatic illustrations of modifications of the kinetic or turbine drive.

In Figure 4 is illustrated a fluid drive of the Föttinger type comprising an impeller 423 keyed to the input shaft 412, guide vanes 425 secured to the housing 414, and a turbine runner 426 keyed to the shaft 427 on which is mounted the primary element of the secondary transmission. The arrangement of these elements in the same as employed in the transmissions illustrated in Figures 1, 2 and 10, the diagrammatic showing being made for purposes of comparison with the arrangements of Figures 5 to 9, inclusive.

Figure 5:
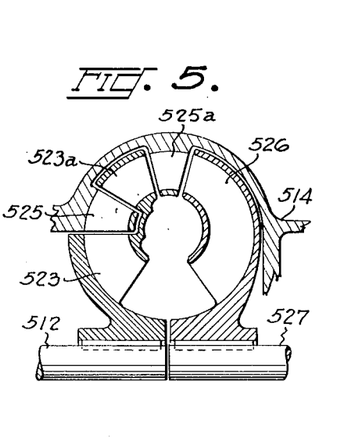
Figure 6:
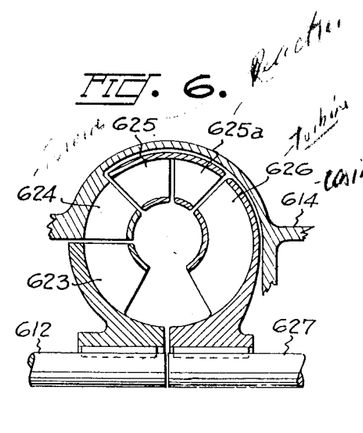

Whenever, as in Figures 5 and 6, the turbine runner keyed to the shaft 27 is operated in the opposite direction to the impeller 23, in order to drive the output shaft in the same direction of rotation as the input shaft the sliding gear 41 is moved longitudinally of the shaft 42 into engagement with gear 40, and gear 34 is moved longitudinally of shaft 33 to disengage the driving gear 35. In such an arrangement the gear 34 becomes the reverse gear and gear 41 is caused to mesh with gears 40 and 35 to drive the output shaft in the direction of rotation of the input shaft. In a transmission mechanism embodying the construction illustrated in Figure 2, the direction of rotation of the output shaft is controlled by valves 64 and 65.

In Figure 5 is shown a modification of a Föttinger type fluid drive wherein dual impellers 523 and 523a are operated by the input shaft 512. Dual turbine runners 525 and 525a are interconnected for operation in the same direction as the impellers, the turbine 525a being affixed to the housing 514. A third turbine runner 526 is keyed to shaft 527 on which is mounted the primary element of the secondary transmission. In this construction the reaction from the first turbine runner 525 is taken by the first impeller 523 and the reaction from the second turbine runner 525a is received by the second impeller 523a. The reaction load from the turbine runner 526 is received by the turbine runner 525a.

A structure productive of high torque ratios at high speeds is illustrated in Figure 6. In this construction reaction and balance blades 625 and 625a are positioned in the fluid circuit between turbine runners 624 and 626 and tend to operate in opposite directions. The turbine 624 connected to casing 614 operates in the same direction as the impeller 623, whereas the turbine runner 626 keyed to the shaft 627 operates in the opposite direction to the impeller. The reactions from the respective turbine runners tend to hold the reaction-balance wheels 625 and 625a stationary until such time as the transmission rotates as a unit in a 1:1 ratio.

Figure 7:
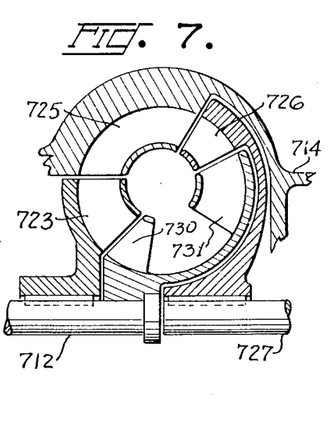

In the arrangement shown in Figure 7 guide vanes 725 are positioned in the fluid circuit between impeller 723 and turbine 726. In this construction impeller 723 is keyed to input shaft 712, guide vanes 725 are secured to housing 714, and turbine runner 726 is keyed to shaft 727 on which is mounted the primary element of the secondary transmission. In this structure a pair of reaction-balance runners 730, 731 are provided to guide the fluid from the discharge end of the turbine runner 726 to the intake side of the impeller 723. When the unit is functioning as a fluid coupling in a 1:1 ratio, the reaction-balance blades rotate with the unit. At other times the reaction-balance blades tend to remain stationary due to the reaction therebetween.

Figure 8:
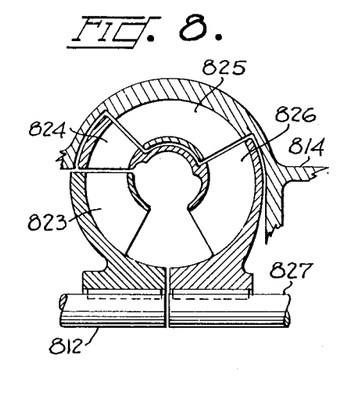
Figure 9:
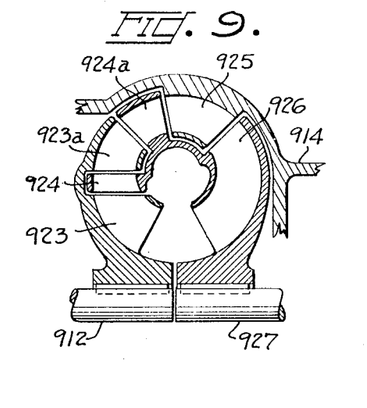

In Figures 8 and 9 are illustrated structures wherein a plurality of turbine runners are employed for operation in the same direction as the impeller. In Figure 8 the impeller 823 keyed to input shaft 812 delivers the fluid to turbine runner 824. Guide vanes 825 are secured to housing 814 and act as a reaction member for turbine runner 826 keyed to shaft 827. The turbine runners 824 and 826 are interconnected for operation in the direction of operation of the impeller 823. Thus it is shown that the invention may be used on the impulse type of fluid drive wherein two turbine runners rotate in the same direction as the impeller.

In Figure 9 is illustrated a structure of the impulse type wherein two impellers 923 and 923a, each of which is driven by the input shaft 912, deliver fluid to turbine runners 924 and 924a interconnected for operation in the same direction as the impellers and also interconnected with a third turbine runner 926 keyed to the shaft 927 and also operated in the same direction as the impeller. Reaction fluid from the turbine 926 is received by the guide vanes 925 affixed to the housing 914.

Figure 10:
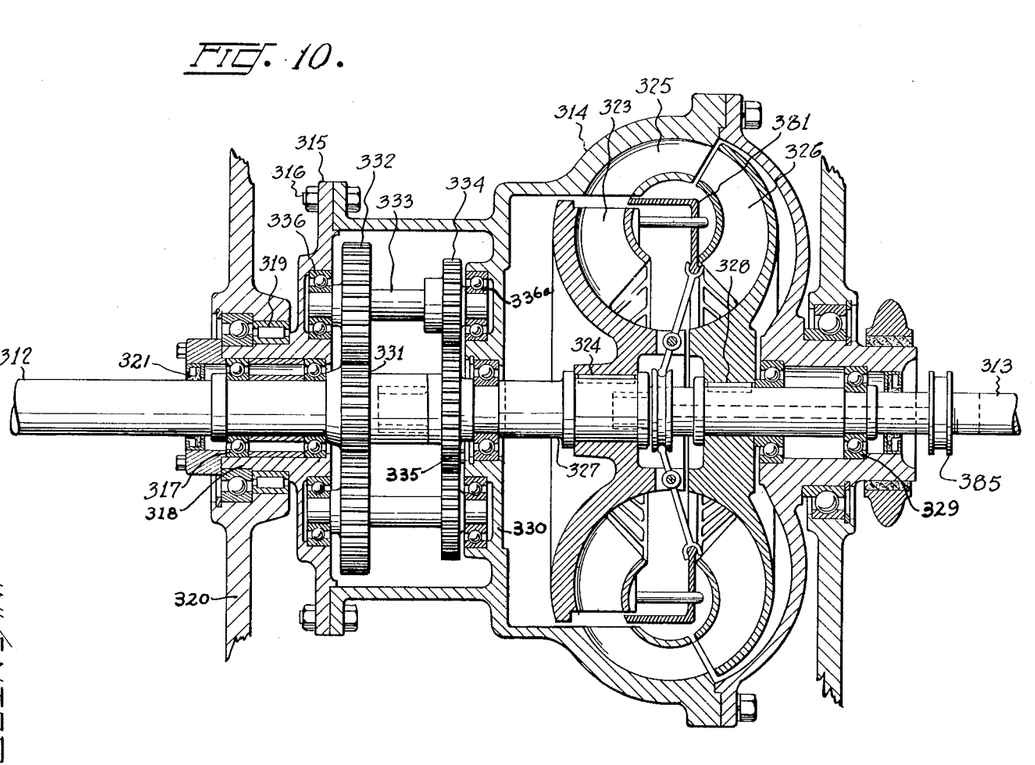
Figure 10 is a sectional elevation, taken longitudinally, of a transmission mechanism in which the mechanical gear transmission is arranged ahead of the turbo gear.

The transmission unit illustrated in Figure 10 comprises an input shaft 312 and an output shaft 313 mounted in axial alignment. Rotatably journaled on the driving and driven shafts is a casing 314 enclosing the ends of the respective shafts and having mounted therewithin a primary drive comprising a gear train for developing torque by means of the ratio differential between gears, and a secondary drive comprising a kinetic or turbine drive for transmitting torque by means of fluid velocities and pressures.

The casing 314 is provided with an end plate 315 secured thereto as by bolts 316. The plate 315 is provided with a cylindrical flange 318 forming a housing for bearings 317 upon which the casing 314 is journaled. A one way brake or free wheeling unit 319 of conventional design is mounted between the cylindrical portion 318 of the end plate 315 and a frame member 320 for preventing reverse rotation of the casing. The casing is equipped with oil seal rings 321 as is usual in this type of construction.

The primary drive comprises sun gear 331 keyed to the input shaft 312 and gear 332 keyed to countershaft 333 and constantly in mesh with the sun gear 331. The countershaft 333 is journaled in bearings 336 mounted in the end plate 315 and bearings 336a mounted in a transverse wall 330 of the casing. Also keyed to countershaft 333 is a second gear 334 which is constantly in mesh with gear 335 keyed to a stub shaft 327 on which is mounted the primary element of the secondary drive.

The secondary drive comprises an impeller 323 secured to the stub shaft 327 as by means of a key 324. A turbine runner 326 is affixed to the output shaft 313 as by means of a key 328. Guide vanes 325 secured to the casing 314 are arranged in the fluid circuit between the impeller 323 and the turbine runner 326. Bearings 329 are provided between the casing and the output shaft 313.

In the construction illustrated in Figure 10 shaft 313 is driven in the direction of rotation of the drive shaft 312, no provision being made for reversing the direction of rotation of the driven shaft.

In operation, assuming that the input shaft 312 is connected to a prime mover, rotation of this shaft drives the sun gear 331 which in turn drives gear 335 through the gear train 332 and 334. Rotation of gear 335 drives the impeller 323 which in turn imparts movement to the fluid within the fluid circuit of the turbine drive. The load on the driven shaft 313 reacts through the turbine runner 326 onto guide vanes 325 to hold the casing stationary against the one-way brake 319. In this construction the gear 335 drives the impeller 323 at a lesser number of revolutions per minute than the speed of the input shaft 312. It will be appreciated, however, that a mechanical step-up transmission gear may be employed for driving the impeller 323 at a greater number of revolutions per minute than that of the input shaft 312. Thus the step-down transmission gear shown in Figure 10 may be replaced by a step-up transmission gear, according to the use to be made of the apparatus.

Having now described my invention and in what manner the same may be used, what I claim as new and desire to protect by Letters Patent is:

1. In a power transmission device, an input shaft and an output shaft in axial alignment, a rotatable housing journaled on said shafts for rotation relative thereto, a stub shaft journaled in said housing in alignment with and between said first two shafts, a fluid drive of the Föttinger type mounted in said housing, one member of said fluid drive being keyed to said stub shaft, a differential gear train mounted in said housing comprising a gear keyed to said stub shaft, a gear keyed to said output shaft, and gearing journaled in said housing interconnecting said first named gears.

2. In a power transmission device, an input shaft and an output shaft in axial alignment, a rotatable housing journaled on said shafts for rotation relative thereto, a stub shaft journaled in said housing between said first two shafts, a first transmission mounted in said housing, one member of said transmission being secured to said input shaft, a second member of said transmission being secured to said stub shaft, a third member of said transmission connected to said housing intermediate said first and second members, a second transmission mounted in said housing, one member of said second transmission secured to said stub shaft, a second member of said second transmission secured to said output shaft, and a third member of said second transmission connected to said housing intermediate said first and second members, each of said third members of said transmissions comprising reaction members for transmitting a part of the load from the driven shaft to said first and second transmissions through said housing.

3. In a power transmission device, an input shaft and an output shaft, a first transmission comprising a fluid drive of the Föttinger type having a primary element secured to said input shaft, a second transmission having a driven member secured to the output shaft, rotatable means common to each of said shafts and rotatable relative thereto, means connecting said rotatable means to one element of each of said transmissions, and clutch means for connecting said rotatable means and the primary element of the fluid drive.

4. In a power transmission device, an input shaft and an output shaft in axial alignment, a rotatable housing journaled on said shafts for rotation relative thereto, a stub shaft journaled in said housing in alignment with and between said first two shafts, a fluid drive of the Föttinger type mounted in said housing, one member of said fluid drive being keyed to said stub shaft, a second member of said fluid drive keyed to said input shaft, and a third member of said fluid drive secured to said housing and rotatable therewith, a differential gear train mounted in said housing comprising a sun gear keyed to said stub shaft and a driving gear keyed to said output shaft, said gear train including a countershaft, a gear journaled on said countershaft in constant mesh with said sun gear, and a second gear journaled on said countershaft in mesh with said driving gear.

5. In a power transmission device, an input shaft and an output shaft, a rotatable housing journaled on said shafts for rotation relative thereto, first and secondary transmissions mounted in said housing, at least one of said transmissions comprising a fluid drive of the Föttinger type, a reaction member in each of said transmissions carried by said housing, means interconnecting the driven element of the first transmission with the primary element of the secondary transmission for producing a compound torque ratio, and clutch means for connecting said housing and said input shaft for completing a mechanical connection between the input shaft and the reaction members of the first and secondary transmissions.

6. In a power transmission device, an input shaft and an output shaft in axial alignment, a rotatable housing journaled on said shafts for rotation relative thereto, a stub shaft journaled on said housing in alignment with and between said first two shafts, a fluid drive of the Föttinger type mounted in said housing, one member of said fluid drive being keyed to said stub shaft, a hydraulic pressure drive mounted in said housing comprising a pump and motor, elements of said pump being mounted on said stub shaft, elements of said motor being mounted on said output shaft, elements of a pump and motor carried by said housing and cooperating with said first named elements to complete said pressure drive, and means mounted in said housing for determining the direction of operation of said motor.

7. In a power transmission device, an input shaft and an output shaft, a pair of conjoined transmissions, a reaction member for receiving the reaction load through each of said transmissions, means interconnecting the driven element of one of said transmissions with the driving element of the other of said transmissions in such manner as to produce a compound torque ratio, means interconnecting said reaction elements, a one-way brake connected to said last named means for resisting the reaction on said reaction elements, and means for connecting said input shaft and said second named means for driving said transmissions in substantially a 1:1 torque ratio.

8. In a power transmission device, an input shaft and an output shaft, a pair of conjoined transmissions, at least one of said transmissions comprising a fluid drive of the Föttinger type, a rotatable housing common to both said transmissions for transmitting a part of the reaction load to each of said transmissions, each of the said transmissions having a reaction member carried by said housing, and at least one element of said fluid drive being connected to the primary element of said other transmission whereby said element drives said other transmission, and clutch means for connecting said input shaft and said housing for driving said transmission in substantially a 1:1 speed ratio.

9. In a power transmission device, an input shaft and an output shaft, a pair of conjoined transmissions, a reaction member common to each of said transmissions for transmitting the reaction load to each of said transmissions, at least one of said transmissions comprising a fluid drive of the Föttinger type, clutch means for completing a direct mechanical connection between the input shaft and said common reaction member, one of the elements of said fluid drive being directly connected with an element of said direct mechanical connection for absorbing a portion of the reaction load.

10. In a power transmission device, an input shaft and an output shaft, a rotatable housing journaled on said shafts for rotation relative thereto, first and secondary transmissions mounted in said housing, said first transmission comprising a fluid drive of the Föttinger type having an impeller, a reaction member and a turbine runner, a reaction member in said secondary transmission, both of said reaction members being integral with said housing to constitute a common reaction member, driving and driven elements in said secondary transmission, and means interconnecting the turbine runner of the first transmission and the driving element of the secondary transmission.

11. In a power transmission device, an input shaft and an output shaft, a rotatable housing journaled on said shafts for rotation relative thereto, first and secondary transmissions mounted in said housing, said first transmission comprising a fluid drive of the Föttinger type having an impeller, a reaction member and a turbine runner, said secondary transmission comprising a driving element, a reaction member and a driven element, said driving element being connected with said turbine runner and said reaction members in both transmissions being integral with said housing, and an overriding brake affixed to said housing for preventing rotation of said housing in a direction opposed to the direction of rotation of the input shaft.

12. In a power transmission device, an input shaft and an output shaft, a rotatable housing journaled on said shafts for rotation relative thereto, first and secondary transmissions mounted in said housing, a reaction member in each of said transmissions integral with said housing, at least one of said transmissions comprising a fluid drive of the Föttinger type comprising an impeller and a pair of turbine runners, said impeller constituting a driving element and said runners constituting driven elements, the other transmission including driving and driven elements and means interconnecting a driven element of the first transmission with the driving element of the secondary transmission for producing a compound torque ratio between said input and output shafts.

13. In a power transmission device, an input shaft and an output shaft, a rotatable housing journaled on said shafts for rotation relative thereto, first and secondary transmissions mounted in said housing, a reaction member in each of said transmissions integral with said housing, at least one of said transmissions comprising a fluid drive of the Föttinger type comprising an impeller, a pair of turbine runners arranged coaxially with respect to each other and with respect to the impeller, said impeller constituting a driving element and said runners constituting driven elements, and a set of guide vanes arranged in the fluid circuit between said turbine runners, said guide vanes being secured to said housing, the other transmission including driving and driven elements, a one-way brake connected to said housing for resisting the reaction on said guide vanes, and means interconnecting a driven element of the first transmission with the driving element of the secondary transmission for producing a compound torque ratio between said input and output shafts.

14. In a power transmission device, an input shaft and an output shaft, a housing journaled on said shafts for rotation relative thereto, first and secondary transmissions mounted in said housing, a reaction member in each of said transmissions integral with said housing, at least one of said transmissions comprising a fluid drive of the Föttinger type comprising an impeller, a turbine runner, the vanes of said turbine runner being so arranged that said turbine runner rotates in the same direction as said impeller, said impeller constituting a driving element and said runner constituting a driven element, a pair of reaction-balance wheels arranged in said fluid circuit on the discharge side of said turbine and on the entrance side of said impeller for receiving the reaction from said turbine and returning the fluid discharged therefrom to said impeller; a guide wheel arranged in said fluid circuit between said impeller and said turbine runner, said guide wheel being connected to said housing to constitute one of said reaction members, the other transmission including driving and driven elements, a one-way brake connected to said housing for resisting the reaction on said guide wheel, and means interconnecting a driven element of the first transmission with the driving element of the secondary transmission for producing a compound torque ratio between said input and output shafts.

15. In a power transmission device, an input shaft and an output shaft, a housing journaled on said shafts for rotation relative thereto, first and secondary transmissions mounted in said housing, a reaction member in each of said transmissions integral with said housing, at least one of said transmissions comprising a fluid drive of the Föttinger type comprising a pair of impeller wheels, a turbine runner arranged on the discharge side of each of said impeller wheels, a third turbine runner interconneced with each of the other two turbine runners for rotation in the same direction with respect thereto and with respect to the impeller wheels, said impeller wheels constituting a driving element and said runners constituting driven elements, a guide wheel arranged in said fluid circuit between two of said turbine runners, said guide wheel being connected to said housing to constitute one of said reaction members, the other transmission including driving and driven elements, a one-way brake connected to said housing for resisting the reaction on said guide wheel, and means interconnecting a driven element of the first transmission with the driving element of the secondary transmission for producing a compound torque ratio between said input and output shafts.

16. In a power transmission device, an input shaft and an output shaft, a housing journaled on said shafts for rotation relative thereto, first and secondary transmissions mounted in said housing, a reaction member in each of said transmissions integral with said housing, at least one of said transmissions comprising a fluid drive of the Föttinger type comprising a pair of impeller wheels, a turbine runner arranged on the discharge side of each of the impeller wheels for receiving the fluid discharged by said impeller wheels, said turbine runners being interconnected for operation in the same direction as said impeller wheels, and a third turbine runner arranged coaxially with respect to said impellers and said first mentioned turbine runners, said third turbine runner also being arranged to rotate in the same direction as said impeller wheels and said first mentioned turbine runners, said turbine runners constituting driven elements, the other transmission including driving and driven elements, and means interconnecting a driven element of the first transmission with the driving element of the secondary transmission for producing a compound torque ratio between said input and output shaft.

17. In a power transmission device, an input shaft and an output shaft, a rotatable housing journaled on said shafts for rotation relative thereto, first and secondary transmissions mounted in said housing, a reaction member in each of said transmissions integral with said housing, at least one of said transmissions comprising a fluid drive of the Föttinger type having an impeller, guide vanes and a turbine runner, and valve means for controlling the rate of flow of liquid from the impeller.

18. In a power transmission device, an input shaft and an output shaft, a rotatable housing journaled on said shafts for rotation relative thereto, a first transmission comprising a fluid drive of the Föttinger type having a primary element secured to said input shaft, a secondary transmission having a driven member secured to said output shaft, means connecting said housing to one of the elements of each of the transmissions, clutch means for connecting said input shaft to said housing for driving said transmissions in substantially a 1:1 ratio, and valve means for controlling the power input of the primary element.

19. In a power transmission device, an input shaft and an output shaft, a rotatable housing journaled on said shafts for rotation relative thereto, a first transmission comprising a fluid drive of the Föttinger type having a primary element secured to said input shaft, a secondary transmission having a driven member secured to said output shaft, means connecting said housing to one of the elements of each of the transmissions, clutch means for connecting said input shaft to said housing for driving said transmissions in substantially a 1:1 ratio, and means for operating the output shaft in the reverse direction to the input shaft.

20. In a power transmission device, an input shaft and an output shaft, a rotatable housing journaled on said shafts for rotation relative thereto, first and secondary transmissions mounted in said housing, at least one of said transmissions comprising a fluid drive of the Föttinger type having an impeller, a reaction member and a turbine runner, said turbine runner constituting a driven element, guide vanes in said fluid drive carried by said housing, planet gears in the other of said transmissions journaled in said housing, driving and driven elements in said other transmission, and means interconnecting the driven element of the first transmission with the driving element of the secondary transmission for producing a compound torque ratio between said input and output shafts.

21. In a power transmission device an input shaft and an output shaft, a pair of conjoined transmissions, each having driving and driven elements, a reaction member common to both said transmissions for transmitting a part of the reaction load to each of said transmissions, means interconnecting the driven element of one of said transmissions with the driving element of the other of said transmissions in such manner as to produce a compound torque ratio between said input and output shafts, and clutch means for completing a direct mechanical connection between the input shaft and said common reaction member.

DANIEL F. McGILL.

REFERENCES CITED

The following references are of record in the file of this patent:

UNITED STATES PATENTS

| Number | Name | Date |
|---|---|---|
| 1,199,359 | Föttinger | Sept. 26, 1916 |
| 2,015,300 | Dell | Sept. 24, 1935 |
| 2,147,528 | Föttinger | Feb. 14, 1939 |
| 2,186,025 | Jandasek | Jan. 9, 1940 |
| 2,204,779 | Swennes | June 18, 1940 |
| 2,232,101 | DeTurk | Feb. 18, 1941 |
| 2,284,123 | Breer | May 26, 1942 |
| 2,318,660 | Barrett | May 11, 1943 |
| 2,319,706 | Reit | May 18, 1943 |
| 2,326,994 | Duffield | Aug. 17, 1943 |
| 2,346,365 | Duffield | Apr. 11, 1944 |

FOREIGN PATENTS

| Number | Country | Date |
|---|---|---|
| 450,953 | Great Britain | Apr. 24, 1935 |